(12) United States Patent
Hoffmeyer et al.

(10) Patent No.: US 9,954,602 B2
(45) Date of Patent: Apr. 24, 2018

(54) SATELLITE COMMUNICATIONS DATA PROCESSING

(71) Applicant: The Boeing Company, Chicago, IL (US)

(72) Inventors: Mark Andrew Hoffmeyer, Torrance, CA (US); Kristina Miller, Redondo Beach, CA (US); Irwin Balter, Los Angeles, CA (US); Tae Jung Roh, Los Angeles, CA (US)

(73) Assignee: THE BOEING COMPANY, Chicago, IL (US)

( * ) Notice: Subject to any disclaimer, the term of this patent is extended or adjusted under 35 U.S.C. 154(b) by 389 days.

(21) Appl. No.: 13/666,449

(22) Filed: Nov. 1, 2012

(65) Prior Publication Data

US 2014/0119385 A1 May 1, 2014

(51) Int. Cl.
*H04B 7/185* (2006.01)

(52) U.S. Cl.
CPC .................... *H04B 7/18515* (2013.01)

(58) Field of Classification Search
None
See application file for complete search history.

(56) References Cited

U.S. PATENT DOCUMENTS

| | | | |
|---|---|---|---|
| 4,931,802 A | 6/1990 | Assal et al. | |
| 6,584,140 B1 * | 6/2003 | Lee | H04B 1/7143 375/132 |
| 7,542,716 B2 | 6/2009 | Bell et al. | |
| 8,064,920 B2 | 11/2011 | Bell et al. | |

(Continued)

FOREIGN PATENT DOCUMENTS

| | | |
|---|---|---|
| EP | 1139584 A2 | 10/2001 |
| EP | 2184866 A1 | 5/2010 |

(Continued)

OTHER PUBLICATIONS

Extended European Search Report, dated Jun. 30, 2014, regarding Application No. EP13191118.2, 8 pages.
European Patent Office Communication regarding Third Party Submission, dated Mar. 10, 2015, regarding Application No. EP131911182, 88 pages.

(Continued)

*Primary Examiner* — Adnan Baig
(74) *Attorney, Agent, or Firm* — Yee & Associates, P.C.

(57) ABSTRACT

An apparatus comprising a backplane and a number of transponder slices connected to the backplane to form a transponder. The number of transponder slices comprise an analog front end configured to receive an analog input comprising a first plurality of bandwidths and a first plurality of interface frequencies, analog to digital converters configured to convert the analog input to digital signals, a digital channelizer configured to process the digital signals to generate a plurality of frequency slices, a digital combiner configured to assemble the plurality of frequency slices to form output sub-bands, a digital switch configured to route the plurality of frequency slices from the digital channelizer to the digital combiner, digital to analog converters configured to convert the output sub-bands to an analog output, and an analog back end configured to transmit the analog output comprising a second plurality of bandwidths and a second plurality of interface frequencies.

10 Claims, 3 Drawing Sheets

(56) References Cited

U.S. PATENT DOCUMENTS

| | | | | |
|---|---|---|---|---|
| 2004/0185775 A1* | 9/2004 | Bell | ............... | H04B 7/18515 455/12.1 |
| 2005/0170797 A1* | 8/2005 | Seisenberger | ....... | G06K 7/0008 455/141 |
| 2005/0275504 A1* | 12/2005 | Torza | ................. | H04Q 3/68 340/2.22 |

FOREIGN PATENT DOCUMENTS

| | | |
|---|---|---|
| JP | H05227246 A | 9/1993 |
| JP | 2006516867 A | 7/2006 |
| JP | 2007266858 A | 10/2007 |
| JP | 2010514311 A | 4/2010 |
| WO | WO2004073229 A2 | 8/2004 |
| WO | WO2009144096 A1 | 12/2009 |

OTHER PUBLICATIONS

Japanese Patent Office Notice for Reasons for Rejection, dated Aug. 31, 2017, regarding Application No. 2013-226370, 4 pages. English Translation Only.

European Patent Office Notice of Opposition to a European Patent, dated May 3, 2017, regarding Application No. 13191118.2, 44 pages.

Clos, "A Study of Non-blocking Switching Networks", Bell Labs Technical Journal, Oct. 30, 1953, 2 pages. Abstract Only.

Haardt et al., "Internet Switching by Satellite: An Ultra-fast processor with Radio Burst Switching", Proceedings of the First Symposium on Potentially Disruptive Technologies and Their Impact in Space Programs, Jul. 4, 2005, 19 pages.

Schwartz, "Telecommunication Networks: Protocols, Modeling and Analysis", Addison-Wesley Series in Electrical and Computer Engineering, 1987, 13 pages.

\* cited by examiner

SATELLITE COMMUNICATIONS DATA PROCESSING

BACKGROUND INFORMATION

1. Field

The present disclosure relates generally to satellites and to systems and methods for processing communications data on a communications satellite. More particularly, the present disclosure relates to systems and methods for processing communications data by a transponder on a communications satellite.

2. Background

Satellites are used in a variety of diverse fields. For example, without limitation, satellites may be used for navigation, communications, environmental monitoring, weather forecasting, broadcasting, and other applications. Many homes, businesses, government organizations, and other users may use satellites on a daily basis for entertainment, communications, information gathering and other purposes. Hundreds of man-made satellites now orbit the earth. Each year more satellites are launched.

A typical modern satellite may include a metal or composite frame that houses a power source and various electronic components. The power source may include, for example, one or more batteries, solar cells, or other power sources or various combinations of power sources. The typical modern satellite also includes one or more antennas.

The electronic components on a satellite may include one or more transponders. The transponders may be clusters of electronic components including one or more receivers, frequency translators, and transmitters. Each transponder may be configured for a particular bandwidth. The total bandwidth of the satellite may be provided by the number of transponders.

The transponders on a communications satellite may be configured to receive multiple uplink beams from the earth, another satellite, or other stationary or mobile locations via uplink antennas. Each of the received beams may be amplified and down-converted for further processing by the transponders. The down-converted beams then may be switched, multiplexed or otherwise routed and combined prior to up-conversion and re-transmission on a downlink beam to the earth, other satellite, or other stationary or mobile location via a downlink antenna.

The transponders on a communications satellite may be analog or digital. For analog transponders, switching may be limited to point-to-point mapping of entire uplink antenna beams to particular downlink antenna beams.

A digital transponder on a communications satellite may provide the functionality of the transponder using digital signal processing. A digital transponder may be configured to divide, control and monitor bandwidths and power allocations for communications signals onboard the satellite in a manner that may not be achieved with an analog transponder. A digital transponder may have the ability to perform switching of inputs to outputs in a highly flexible manner.

Accordingly, it would be beneficial to have a method and apparatus that takes into account one or more of the issues discussed above as well as possibly other issues.

SUMMARY

An illustrative embodiment of the present disclosure provides an apparatus comprising a backplane and number of transponder slices connected to the backplane to form a transponder. The number of transponder slices comprise an analog front end configured to receive an analog input comprising a first plurality of bandwidths and a first plurality of interface frequencies, analog to digital converters configured to convert the analog input to digital signals, a digital channelizer configured to process the digital signals to generate a plurality of frequency slices, a digital combiner configured to assemble the plurality of frequency slices to form output sub-bands, a digital switch configured to route the plurality of frequency slices from the digital channelizer to the digital combiner, digital to analog converters configured to convert the output sub-bands to an analog output, and an analog back end configured to transmit the analog output comprising a second plurality of bandwidths and a second plurality of interface frequencies.

Another illustrative embodiment of the present disclosure provides an apparatus comprising an analog front end configured to receive an analog input, analog to digital converters configured to convert the analog input to digital signals, a digital channelizer configured to process the digital signals to generate a plurality of frequency slices, a digital combiner configured to assemble the plurality of frequency slices to form output sub-bands, and a digital switch configured to route the plurality of frequency slices from the digital channelizer to the digital combiner. The digital switch comprises a multiple stage switch network comprising ingress stage switches, middle stage switches, and egress stage switches.

Another illustrative embodiment of the present disclosure provides a transponder slice comprising a digital processing portion and an analog portion. The digital processing portion comprises a digital channelizer configured to process a digital signal to generate a plurality of frequency slices, a digital combiner configured to assemble the plurality of frequency slices to form output sub-bands, and a digital switch configured to route the plurality of frequency slices from the digital channelizer to the digital combiner and to a number of other transponder slices. The analog portion comprises an analog front end configured to receive an analog input comprising a first plurality of bandwidths and a first plurality of interface frequencies, an analog to digital converter configured to convert the analog input to the digital signal, a digital to analog converter configured to convert the output sub-bands to an analog output, and an analog back end configured to transmit the analog output comprising a second plurality of bandwidths and a second plurality of interface frequencies.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number", as used herein with reference to items, means one or more items. For example, "a number of different considerations" means one or more different considerations.

The illustrative embodiments provide a transponder for processing a sub-band spectrum received on an uplink beam at a communications satellite. The transponder comprises a digital channelizer, a digital switch, and a digital combiner. The channelizer is configured to divide the sub-band spectrum into a plurality of frequency slices. The digital switch is configured to route the plurality of frequency slices to the digital combiner. The digital combiner is configured to re-assemble the frequency slices to form one or more output sub-bands for transmission on an output beam of the communications satellite.

In accordance with an illustrative embodiment, the transponder may comprise a modular analog front end for the digital channelizer. The modular analog front end may be configured to receive a plurality of input bandwidths and interface frequencies. The transponder may comprise a modular analog back end for the digital combiner. The modular analog back end may be configured to transmit a plurality of output bandwidths and interface frequencies.

In accordance with an illustrative embodiment, the digital switch may comprise a crossbar switch, a multiple stage switch network, or another switch structure for routing frequency slices from the digital channelizer to the digital combiner. For example, without limitation, the digital switch may comprise a three stage Clos switch network including ingress stage switches, middle stage switches, and egress stage switches.

Figure 1:
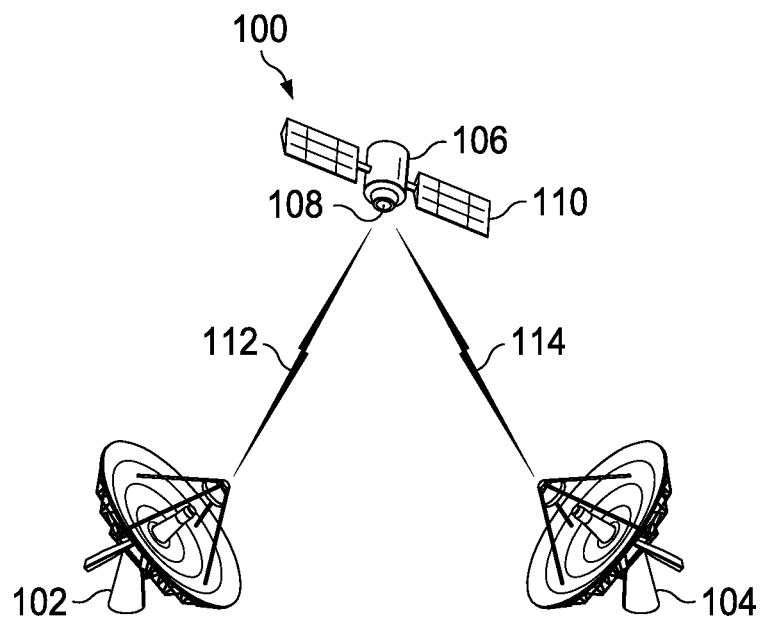
FIG. 1 is a pictorial representation of satellite communications in accordance with an illustrative embodiment.

Turning now to FIG. 1, a pictorial representation of satellite communications is depicted in accordance with an illustrative embodiment. In this example, communications satellite 100 provides communication of data between ground station 102 and ground station 104. In other examples, communications satellite 100 may provide communications between and among any number of ground stations, other satellites, or other stationary or mobile locations on or above the earth, in any combination.

Communications satellite 100 may include housing 106, number of antennas 108, and solar panels 110. Number of antennas 108 and solar panels 110 may be mounted on housing 106.

Number of antennas 108 may be configured for receiving uplink beams 112 from ground station 102 or another transmitter or any number of transmitters. Number of antennas 108 also may be configured for transmitting downlink beams 114 to ground station 104 or to another receiver or to any number of receivers.

Number of antennas 108 may comprise any types of antennas that may be appropriate for use on a satellite for satellite communications. For example, without limitation, number of antennas 108 may include digital or analog beam forming antennas having any number of independently addressable transmit or receive elements. Examples of such antennas may include spot beam dishes, multi-beam feed antennas, direct radiating array antennas, and phased array-fed reflector antennas.

Housing 106 may contain various electronic components for processing uplink beams 112 received via antennas 108 and for generating downlink beams 114 for transmission via antennas 108. For example, housing 106 may contain a payload comprising a number of transponders configured for switching and sub-channel routing of uplink beams 112 to downlink beams 114.

Solar panels 110 may be one example of a power source for proving power for operation of the various electronic components in housing 106. Communications satellite 100 may include a battery in housing 106 or other power sources or various combinations of power sources for providing power for the operation of the electronics in housing 106.

Figure 2:
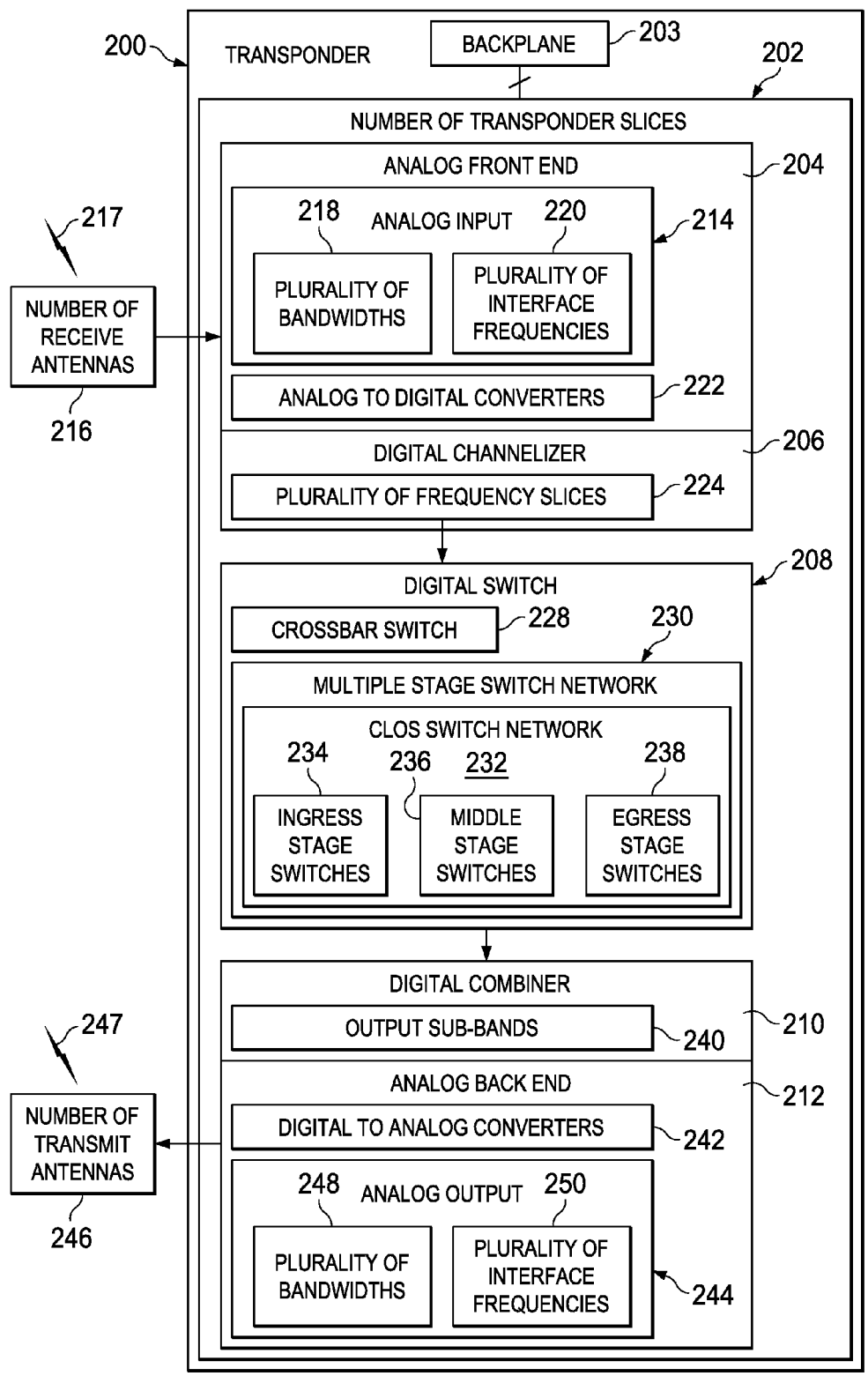
FIG. 2 is a block diagram of a transponder in accordance with an illustrative embodiment.

Turning now to FIG. 2, a block diagram of a transponder is depicted in accordance with an illustrative embodiment. In this example, transponder 200 is an example of one implementation of a transponder for communications satellite 100 in FIG. 1. Transponder 200 may comprise a payload for communications satellite 100.

In accordance with an illustrative embodiment, transponder 200 may comprise a number of transponder slices 202 connected to backplane 203. Backplane 203 may comprise any structure to which any number of transponder slices 202 may be connected to provide a connection for the communication of digital signals between and among number of transponder slices 202. For example, without limitation, backplane 203 may be implemented as part of a housing configured for containing a number of transponder slices 202. For example, without limitation, a number of transponder slices 202 may be implemented on a number of circuit boards that may be configured to be plugged in to backplane 203 to connect together a number of transponder slices 202 via backplane 203.

A number of transponders slices 202 may comprise analog front end 204, digital channelizer 206, digital switch 208, digital combiner 210, and analog back end 212.

Analog front end 204 may be configured to receive analog input 214 from number of receive antennas 216. Number of receive antennas 216 may be referred to as uplink antennas. For example, number of receive antennas 216 may include any appropriate number and type of antennas on a satellite configured to receive uplink beams 217 and to provide received uplink beams 217 as analog input 214 to analog front end 204.

Analog front end 204 may be configured to receive analog input 214 comprising plurality of bandwidths 218 and plurality of interface frequencies 220. Plurality of bandwidths 218 may be referred to as first plurality of bandwidths and plurality of interface frequencies 220 may be referred to as first plurality of interface frequencies.

In this example, including in the claims, plurality of bandwidths 218 refers to how much of the frequency spectrum of analog input 214 that may be received at the inputs to analog front end 204. In accordance with an illustrative embodiment, analog front end 204 may be selectively configured to receive a different plurality of bandwidths 218 of analog input 214 without changing the hardware configuration of analog front end 204. For example, without limitation, analog front end 204 may be configured to receive plurality of bandwidths 218 of 500 MHz, 250 MHz, 125 MHz or other bandwidths or combinations of bandwidths without changing the hardware configuration of analog front end 204.

In this example, including in the claims, plurality of interface frequencies 220 refers to the locations in the frequency spectrum of analog input 214 that may be received at the inputs to analog front end 204. For example, without limitation, an input of analog front end 204 that is configured to receive a 500 MHz bandwidth of analog input 214 may be configured to receive plurality of interface frequencies 220 of 83-583 MHz, or 750-1250 MHz, or 1416-1916 MHz or other interface frequencies spanning a bandwidth of 500 MHz. For example, without limitation, an input of analog front end 204 that is configured to receive a 500 MHz bandwidth of analog input 214 may be configured to receive plurality of interface frequencies 220 of 83-583 MHz from a single one of number of receive antennas 216. Alternatively, an input of analog front end 204 that is configured to receive a 500 MHz bandwidth of analog input 214 may be configured to receive plurality of interface frequencies 220 of 83-333 MHz from a first one of number of receive antennas 216 and to receive plurality of interface frequencies 220 of 333-583 MHz from a second one of number of receive antennas 216. In accordance with an illustrative embodiment, analog front end 204 may be configured to receive different plurality of interface frequencies 220 of analog input 214 without changing the hardware configuration of analog front end 204.

Analog to digital converters 222 may be configured for converting analog input 214 received by analog front end 204 to digital signals for processing by digital channelizer 206. Analog to digital converters 222 may be provided as part of or separate from analog front end 204. Analog front end 204 may be referred to as an analog front end to digital channelizer 206.

Digital channelizer 206 may be configured to process the digital signals derived from analog input 214 to divide the frequency spectrum of analog input 214 into plurality of frequency slices 224. Any appropriate method or system may be implemented in digital channelizer 206 to generate plurality of frequency slices 224 from the digital signals derived from analog input 214.

Plurality of frequency slices 224 may be routed by digital switch 208 from digital channelizer 206 to digital combiner 210. In accordance with an illustrative embodiment, digital switch 208 may include crossbar switch 228, multiple stage switch network 230, or any other appropriate switch structure for routing plurality of frequency slices 224 from digital channelizer 206 to digital combiner 210.

Crossbar switch 228 may be referred to as a cross-point switch, crosspoint switch, or matrix switch. Crossbar switch 228 may be implemented as an assembly of individual switches arranged in a matrix.

Multiple stage switch network 230 may comprise groups of switches arranged in a plurality of stages. For example, without limitation, multiple stage switch network 230 may comprise Clos switch network 232. For example, without limitation, multiple stage switch network 230 may comprise a three stage or other Clos switch network 232 or other multiple stage switch network 230 comprising ingress stage switches 234, middle stage switches 236, and egress stage switches 238. In this example, ingress stage switches 234 may be configured to route plurality of frequency slices 224 from digital channelizer 206 to middle stage switches 236. Middle stage switches 236 may be configured to route plurality of frequency slices 224 from ingress stage switches 234 to egress stage switches 238. Egress stage switches 238 may be configured to route plurality of frequency slices 224 from middle stage switches 236 to digital combiner 210.

In accordance with an illustrative embodiment, digital switch 208 may be configured for routing plurality of frequency slices 224 from digital channelizer 206 to digital combiner 210 in a non-blocking manner. In this case, plurality of frequency slices 224 provided on any inputs to digital switch 208 may be routed by digital switch 208 to any inputs of digital combiner 210. For example, without limitation, digital switch 208 may be implemented in a manner such that any unused input on ingress stage switches 234 may be connected to any unused output on egress stage switches 238 to route a plurality of frequency slices 224 from digital channelizer 206 to digital combiner 210 with or without having to re-arrange existing connections between digital channelizer 206 and digital combiner 210 via digital switch 208.

Digital combiner 210 may be configured to receive plurality of frequency slices 224 from digital switch 208 and to assemble the received frequency slices to form output sub-bands 240. Any appropriate method or system may be implemented in digital combiner 210 to form output sub-bands 240 from the frequency slices received from digital switch 208.

Digital to analog converters 242 may be configured to convert output sub-bands 240 to analog output 244. Digital to analog converters 242 may be provided as part of or separate from analog back end 212. Analog back end 212 may be referred to as an analog back end for digital combiner 210.

Analog back end 212 may be configured to transmit analog output 244 via a number of transmit antennas 246. A number of transmit antennas 246 may be referred to as downlink antennas. For example, a number of transmit antennas 246 may include any appropriate number and type of antennas on a satellite configured to transmit analog output 244 from analog back end 212 as downlink beams 247.

In accordance with an illustrative embodiment, analog back end 212 may be configured to transmit analog output 244 at plurality of bandwidths 248 and plurality of interface frequencies 250. Plurality of bandwidths 248 may be referred to as second plurality of bandwidths. Plurality of interface frequencies 250 may be referred to as second plurality of interface frequencies. Plurality of bandwidths 248 of analog output 244 may be the same as or different from plurality of bandwidths 218 of analog input 214. Plurality of interface frequencies 250 of analog output 244 may be the same as or different from plurality of interface frequencies 220 of analog input 214. In accordance with an illustrative embodiment, analog back end 212 may be selectively configured to transmit analog output 244 at a different plurality of bandwidths 248 and a different plurality of interface frequencies 250 without changing the hardware configuration of analog back end 212.

The illustration of FIG. 2 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 3:
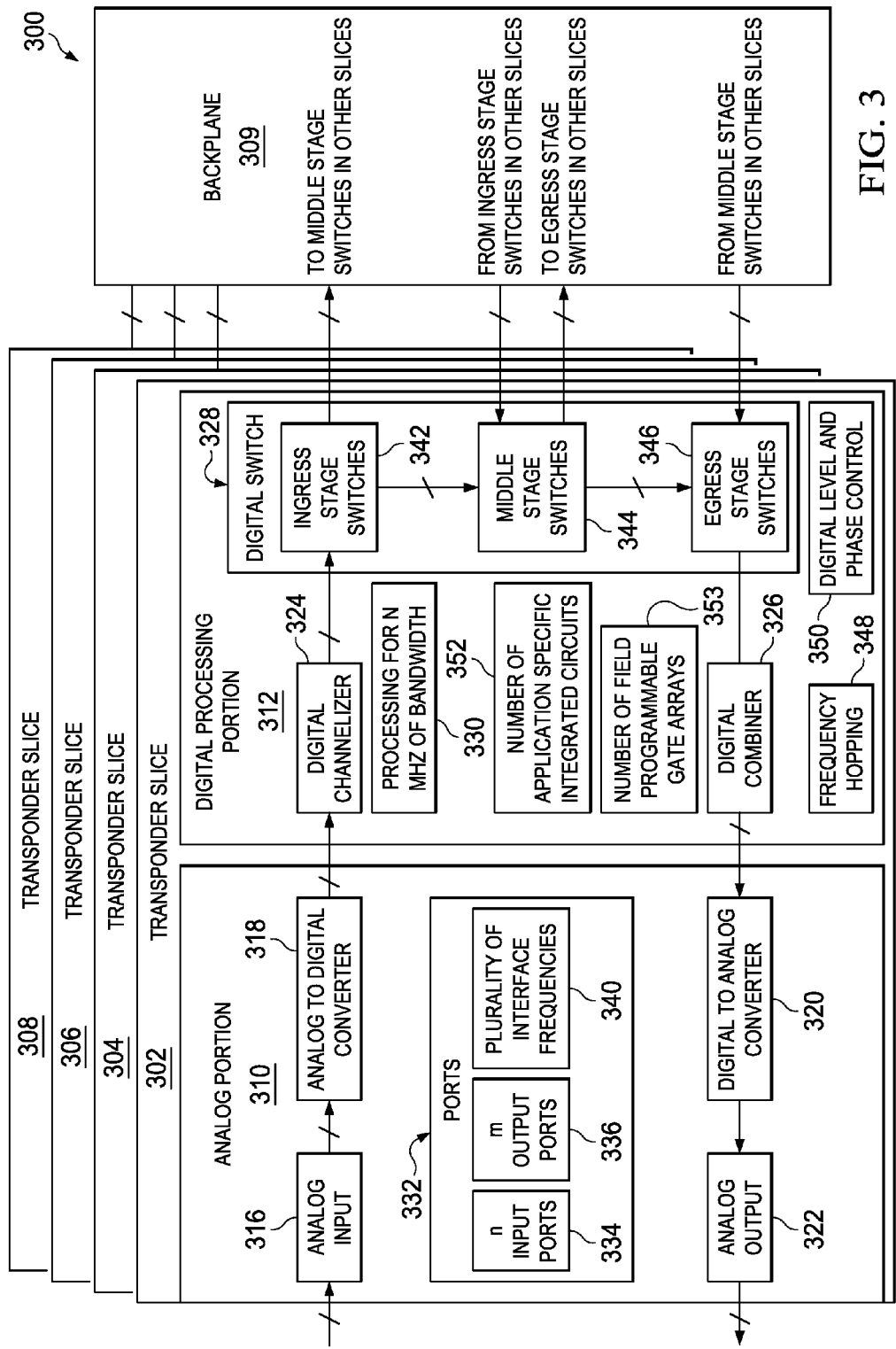
FIG. 3 is a block diagram of a number of transponder slices in accordance with an illustrative embodiment.

Turning now to FIG. 3, a block diagram of a number of transponder slices is depicted in accordance with an illustrative embodiment. In this example, transponder 300 is an example of one implementation of transponder 200 in FIG. 2.

In this example, transponder 300 includes transponder slice 302, transponder slice 304, transponder slice 306, and transponder slice 308 connected to backplane 309. Backplane 309 may comprise any structure to which any number of transponder slices may be connected to provide a connection for the communication of digital signals between and among the transponder slices. For example, without limitation, backplane 309 may be implemented as part of a housing configured for containing transponder slice 302, transponder slice 304, transponder slice 306, and transponder slice 308. For example, without limitation, each of transponder slice 302, transponder slice 304, transponder slice 306, and transponder slice 308 may be implemented on a circuit board or other appropriate structure that may be configured to be plugged in to backplane 309 to connect together transponder slice 302, transponder slice 304, transponder slice 306, and transponder slice 308 via backplane 309.

Transponder 300 may include more or fewer than four transponder slices connected to backplane 309. In accordance with an illustrative embodiment, each of transponder slice 302, transponder slice 304, transponder slice 306, and transponder slice 308 may be implemented as a modular building block. In accordance with an illustrative embodiment, transponder systems providing different processing capacity may be provided by connecting the appropriate number of transponder slices to backplane 309.

Transponder slice 302 will be described in greater detail. Transponder slice 304, transponder slice 306, and transponder slice 308 may be implemented in a manner similar to transponder slice 302. In particular, transponder slice 302, transponder slice 304, transponder slice 306, and transponder slice 308 may have identical hardware configurations.

Transponder slice 302 may include analog portion 310 and digital processing portion 312. Analog portion 310 may include analog input 316, analog to digital converter 318, digital to analog converter 320, and analog output 322. Analog input 316 and analog to digital converter 318 may form an analog front end for digital channelizer 324 in digital processing portion 312. Digital to analog converter 320 and analog output 322 may form an analog back end for digital combiner 326 in digital processing portion 312.

Digital channelizer 324 may be configured to process the digital signals provided by analog to digital converter 318 to generate frequency slices. Digital combiner 326 may be configured to assemble the frequency slices to form output sub-bands. Digital processing portion 312 may comprise digital switch 328. Digital switch 328 may be configured to route the frequency slices generated by digital channelizer 324 to digital combiner 326. Digital switch 328 also may be configured to route frequency slices generated by digital channelizer 324 to digital combiners on transponder slice 304, transponder slice 306, and transponder slice 308. Similarly, digital switch 328 may be configured to route frequency slices generated by digital channelizers on transponder slice 304, transponder slice 306, and transponder slice 308 to digital combiner 326 on transponder slice 302.

In accordance with an illustrative embodiment, digital processing portion 312 may be configured to provide processing for N MHz of bandwidth. Analog portion 310 may include ports 332. For example, without limitation, ports 332 may include n input ports 334 for analog front end 316 and m output ports 336 for analog back end 322. The number of n input ports 334 may be the same as or different from the number of m output ports 336.

In accordance with an illustrative embodiment, analog portion 310 may be configured to allow the processing for N MHz of bandwidth 330 provided by digital processing portion 312 to be arbitrarily split across n input ports 334 and m output ports 336 such that each of n input ports 334 provides N/n MHz of bandwidth and each of m output ports 336 provides N/m MHz of bandwidth. In accordance with an illustrative embodiment, each of n input ports 334 may be configured to provide the same or different bandwidth as each of m output ports 336. For example, without limitation, in one embodiment where digital processing portion 312 is configured to provide processing for 500 MHz of bandwidth, ports 332 may be configured to provide one 500 MHz input port and one 500 MHs output port, two 250 MHz input ports and two 250 MHz output ports, four 125 MHz input ports and four 125 MHz output ports, or another number of input ports and output ports where the total bandwidth of all of the input ports is 500 MHz and the total bandwidth of all of the output ports is 500 MHz.

In accordance with an illustrative embodiment, analog portion 310 also may be configured to allow flexible selection of plurality of interface frequencies 340 for n input ports 334 and m output ports 336.

In accordance with an illustrative embodiment, digital switch 328 may be a portion of a three stage switch network that includes ingress stage switches 342, middle stage switches 344, and egress stage switches 346. Frequency slices from digital channelizer 324 may be routed by ingress stage switches 342 to middle stage switches 344 on transponder slice 302 and to middle stage switches on transponder slice 304, transponder slice 306, and transponder slice 308. Frequency slices may be routed to middle stage switches 344 on transponder slice 302 from ingress stage switches 342 on transponder slice 302 and from ingress stage switches on transponder slice 304, transponder slice 306, and transponder slice 308. Frequency slices may be routed from middle stage switches 344 on transponder slice 302 to egress stage switches 346 on transponder slice 302 and to egress stage switches on transponder slice 304, transponder slice 306, and transponder slice 308. Frequency slices also may be routed to egress stage switches 346 on transponder slice 302 from middle stage switches on transponder slice 304, transponder slice 306, and transponder slice 308. Frequency slices may be routed from egress stage switches 346 on transponder slice 302 to digital combiner 326.

In accordance with an illustrative embodiment, digital processing portion 312 may be configured to perform various types of digital signal processing on the frequency slices generated by digital channelizer 324 before the frequency slices are assembled by digital combiner 326 to form output sub-bands. For example, without limitation, such processing may include frequency hopping 348, digital level and phase control 350, or other types of digital signal processing or various types of digital signal processing in various combinations.

Frequency hopping 348 may be implemented to provide protection against interference and jamming. For example, frequency hopping 348 may comprise permuting frequency slices in a pseudo-random, time-varying fashion with a permute key known to a satellite and to the satellite terminals but not to potential sources of interference. As another example, frequency sub-bands, or portions of the frequency sub-bands may be hopped in a pseudo-random time-varying fashion, with a hop key or multiple hop keys known to the satellite and satellite terminals but not to potential sources of interference.

In accordance with an illustrative embodiment, digital level and phase control 350 may include adjusting the power or voltage level or phase of the communications processed through the transponder by digital signal processing of the digital frequency slices, by means of fixed gain or phase settings, automatic level control, voltage limiting, power limiting, or by other means, which can be applied at the individual digital frequency slices or across arbitrary groups of slices. For example, without limitation, digital level control 350 may be used to provide individual customers with appropriate power levels for their communications via a communications satellite.

The functionality of digital channelizer 324, digital combiner 326, digital switch 328, and other functionality of digital processing portion 312 may be implemented by a number of application specific integrated circuits 352, number of field programmable gate arrays 353, or by any other suitable technology on transponder slice 302. The control of digital channelizer 324, digital combiner 326, digital switch 328, and other functionality of digital processing portion 312 may be implemented by number of application specific integrated circuits 352 on transponder slice 302 or in any other appropriate manner.

The illustration of FIG. 3 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

The block diagrams described herein illustrate the architecture, functionality, and operation of possible implementations of systems, methods, and computer program products according to various illustrative embodiments. In this regard, each block in the block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
   a backplane; and
   a number of transponder slices connected to the backplane to form a transponder, wherein the number of transponder slices each comprise:
   an analog front end configured to receive an analog input comprising a first plurality of bandwidths and a first plurality of interface frequencies;
   analog to digital converters configured to convert the analog input to digital signals;
   a digital channelizer configured to process the digital signals to generate a plurality of frequency slices;
   a digital switch comprising an at least three stage Clos switch network configured to route the plurality of frequency slices from a digital channelizer of a first transponder slice to a digital combiner of a second transponder slice, wherein the digital switch further comprises ingress stage switches, middle stage switches, and egress stage switches, wherein the ingress stage switches are configured to route the plurality of frequency slices to middle stage switches on a transponder slice and to middle stage switches on a number of other transponder slices, and wherein the digital combiner is configured to assemble the plurality of frequency slices to form output sub-bands;
   a digital level and phase control configured to adjust both a power level and a phase of the output sub-bands, the digital level and phase control further configured to limit power of one of an individual or an arbitrary group of the plurality of frequency slices by being configured to perform, on the output sub-bands, at least two of a fixed gain setting, a phase setting, automatic level control, voltage limiting, and power limiting;
   digital to analog converters configured to convert the output sub-bands to an analog output; and
   an analog back end configured to transmit the analog output comprising a second plurality of bandwidths and a second plurality of interface frequencies to individual ones of a plurality of different users, whereby the digital level and phase control combined with the digital to analog converters and the analog back end allows the ones of the plurality of different users to receive varying power levels and varying frequencies for their respective individual communications via the apparatus.

2. The apparatus of claim 1 wherein the number of transponder slices comprises a transponder slice connected to the backplane, comprising:
   a digital processing portion comprising the digital channelizer, the digital combiner, and the digital switch; and
   an analog portion comprising the analog front end, the analog to digital converters, the digital to analog converters, and the analog back end.

3. The apparatus of claim 2, wherein:
   the digital processing portion is configured to process N MHz of bandwidth;
   the analog front end comprises n input ports configured to process an aggregate total of N MHz of bandwidth, wherein each of the n input ports is configured to receive an arbitrary amount of bandwidth less than or equal to N MHz of the analog input; and
   the analog back end comprises m output ports configured to process an aggregate total of N MHz of bandwidth, wherein each of the m output ports is configured to transmit an arbitrary amount of bandwidth less than or equal to N MHz of the analog output.

4. The apparatus of claim 1, wherein the apparatus comprises a payload on a communications satellite.

5. A communications satellite comprising:
   a housing configured for operation while orbiting Earth, the housing including therein:
   an analog front end configured to receive an analog input;
   analog to digital converters configured to convert the analog input to digital signals;
   a digital channelizer configured to process the digital signals to generate a plurality of frequency slices;

a digital switch comprising an at least three stage Clos switch network configured to route the plurality of frequency slices a digital channelizer of a first transponder slice to a digital combiner of a second transponder slice, wherein the digital switch comprising the at least three stage Clos switch network comprises ingress stage switches, middle stage switches, and egress stage switches, wherein the ingress stage switches are configured to route the plurality of frequency slices to middle stage switches on a transponder slice and to middle stage switches on a number of other transponder slices, and wherein the digital combiner is configured to assemble the plurality of frequency slices to form output sub-bands;

a digital level and phase control configured to adjust both a power level and a phase of the output sub-bands, the digital level and phase control further configured to limit power of one of an individual or an arbitrary group of the plurality of frequency slices by being configured to perform, on the output sub-bands, at least two of a fixed gain setting, a phase setting, automatic level control, voltage limiting, and power limiting;

digital to analog converters configured to convert the output sub-bands to an analog output; and an analog back end configured to transmit the analog output comprising a second plurality of bandwidths and a second plurality of interface frequencies to individual ones of a plurality of different users, whereby the digital level and phase control combined with the digital to analog converters and the analog back end allows the ones of the plurality of different users to receive desired varying power levels and varying frequencies for their respective individual communications via the communications satellite.

6. The communications satellite of claim 5, wherein:

the analog front end is configured to receive the analog input comprising a first plurality of bandwidths and a first plurality of interface frequencies; and the analog back end is configured to transmit the analog output comprising a second plurality of bandwidths and a second plurality of interface frequencies.

7. A method of satellite communications data processing, comprising:

receiving an uplink beam from a ground station by an analog front end of a payload on a satellite;

converting the uplink beam to digital signals by the payload;

processing the digital signals by a digital channelizer of a first transponder slice to generate a plurality of frequency slices;

routing the plurality of frequency slices from the digital channelizer to a digital combiner of a second transponder slice by a digital switch of the first transponder slice, wherein the digital switch comprises an at least three stage Clos switch network comprising ingress stage switches, middle stage switches, and egress stage switches, wherein routing, via the ingress stage switches, the plurality of frequency slices to middle stage switches on a transponder slice and to the middle stage switches on a number of other transponder slices;

assembling the plurality of frequency slices by a digital combiner to form output sub-bands, the output sub-bands comprising a second plurality of bandwidths and a second plurality of interface frequencies;

adjusting, by a digital level and phase control, both a power level and a phase of the output sub-bands, wherein adjusting further includes limiting power of one of an individual or an arbitrary group of the plurality of frequency slices by performing, on the output sub-bands, at least two of a fixed gain setting, a phase setting, automatic level control, voltage limiting, and power limiting;

converting, by digital to analog converters, the output sub-bands to an analog output having desired varying power levels and desired varying frequencies for respective ones of a plurality of different individual communication users unrelated to each other; and transmitting, by an analog back end, the analog output to the respective ones of the plurality of different communication users to provide the respective ones of the plurality of different communications users with individual desired varying power levels and individual desired varying frequencies.

8. The method of claim 7 further comprising:

converting the output sub-bands to a downlink beam by the payload; and transmitting the downlink beam by an analog back end of the payload.

9. The method of claim 8, wherein:

receiving the uplink beam comprises receiving an analog input comprising a first plurality of bandwidths and a first plurality of interface frequencies; and transmitting the downlink beam comprises transmitting an analog output comprising a second plurality of bandwidths and a second plurality of interface frequencies.

10. The apparatus of claim 1, wherein each transponder slice is configured to implement frequency hopping to protect against one or more of interference and jamming by permuting one or more of a frequency slice, a frequency sub-band, and a portion of a frequency sub-band with a permute key.

* * * * *

UNITED STATES PATENT AND TRADEMARK OFFICE
CERTIFICATE OF CORRECTION

PATENT NO. : 9,954,602 B2  
APPLICATION NO. : 13/666449  
DATED : April 24, 2018  
INVENTOR(S) : Hoffmeyer et al.

Page 1 of 1

It is certified that error appears in the above-identified patent and that said Letters Patent is hereby corrected as shown below:

In the Claims

Column 11, Line 3, correct "slices a digital channelizer" to read --slices from a digital channelizer--
Column 12, Line 9, correct "by a digital combiner" to read --by the digital combiner--
Column 12, Line 29, correct "different communications users" to read --different individual communications users--
Column 12, Line 36, correct "an analog back end" to read --the analog back end--
Column 12, Line 43, correct "an analog output" to read --the analog output--

Signed and Sealed this
Sixth Day of November, 2018

Andrei Iancu
*Director of the United States Patent and Trademark Office*